United States Patent Office 3,572,181
Patented Mar. 23, 1971

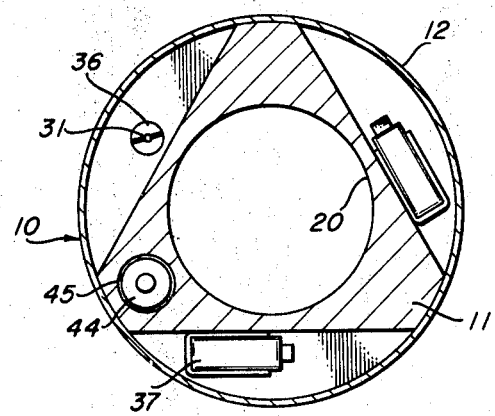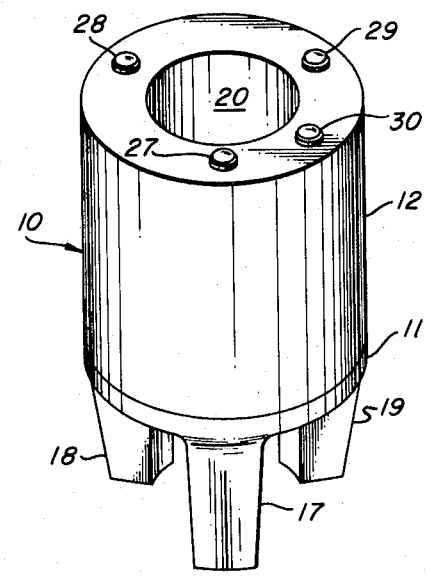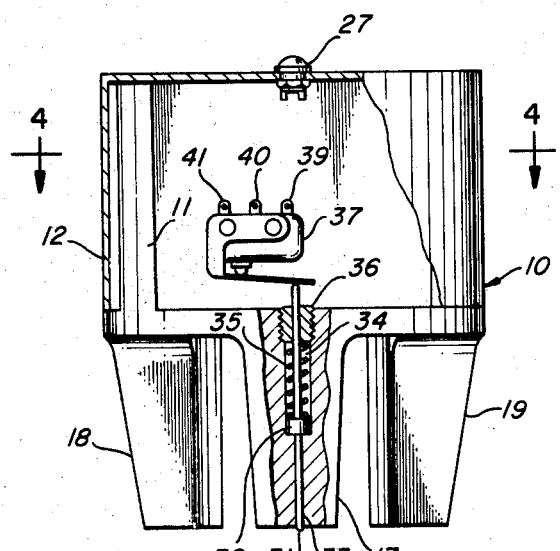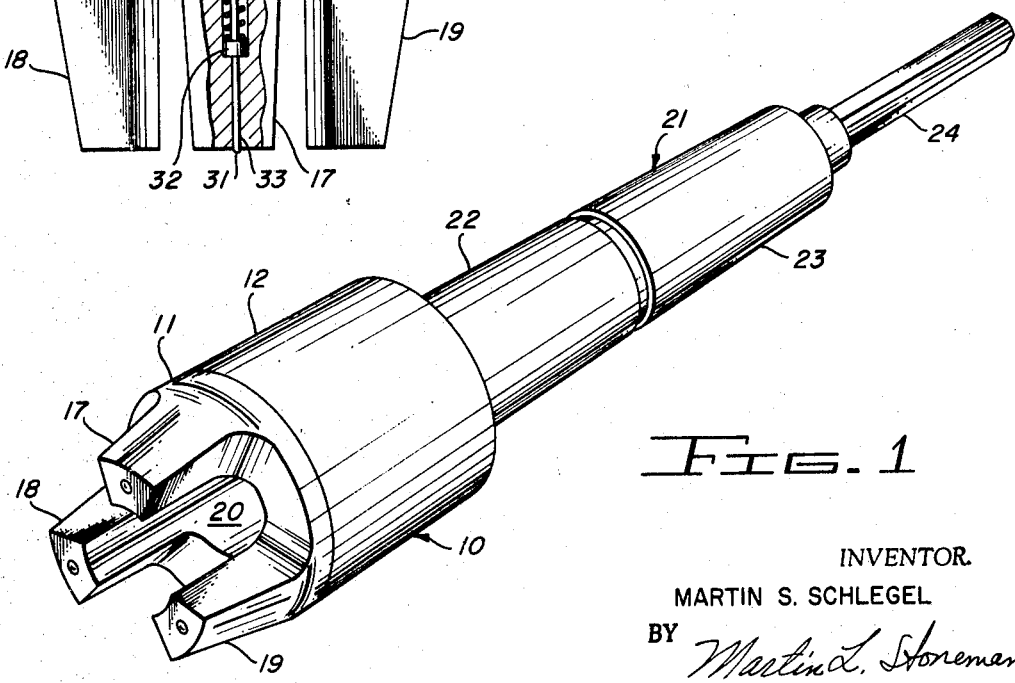

3,572,181
ANGULARITY INDICATING DRILLING
ATTACHMENT
Martin S. Schlegel, 1212 E. Gardenia St.,
Phoenix, Ariz. 85020
Filed Sept. 6, 1968, Ser. No. 758,004
Int. Cl. B23b *49/00*
U.S. Cl. 77—55                                    4 Claims

ABSTRACT OF THE DISCLOSURE

An attachment for a drilling apparatus to maintain the drill at a pre-selected angle. Indicators, responsive to contact between the drilling attachment and the workpiece, verify angular alignment.

BACKGROUND OF THE INVENTION

This invention relates to apparatus for drilling holes in sheet stock.

More particularly, the invention concerns an attachment for a drilling apparatus to maintain the drill at a pre-selected angle to the sheet stock.

In a further aspect, the invention concerns an attachment of the above type having indicator means to verify angular alignment between the drill and the stock.

To accommodate bolts, rivets and other fastening devices, machining holes, especially by drilling, is universal practice during fabrication and production of material assemblies. Assemblies fabricated of sheet stock usually require numerous fastening devices relatively closely spaced and accurately positioned. If the assembly or workpiece is conveniently sized, it may be placed in a drill press or other stationary drilling machine and the drilling tolerance maintained by the inherent stability of the machine. Outsized assemblies, as, for example, land and air vehicle bodies, are not readily adaptable for insertion into a stationary machine, and therefore the drilling operation must be accomplished manually with a hand held drilling apparatus.

A common threaded fastener, extensively utilized by the aircraft industry, employs a tapered, conical shank. Fitting into a tapered hole with controlled interference preloading, the tapered shank fastener evenly distributes stress loading to enhance fatigue life and provide wet sealing not obtainable with straight shank fasteners. A more thorough discussion of the fastener is found in U.S. Pat. No. 3,034,611.

The crucial factor attributing to the superior characteristics of the tapered shank fastener is a precision tapered hole machined into the assembly. Obtaining the desired interference fit requires that the combination drill-tapered reamer be inserted to an exact depth. Proper radial compression and peripheral tension dictate that the hole must be round and normal to the surface of the assembly.

Size and other characteristics of assemblies where tapered shank fasteners are desirable necessitate the use of hand-held drilling apparatus. A precision tapered hole, within acceptable tolerances, is extremely difficult to machine with manual techniques and utilizing conventional drilling gages.

The presently accepted standard drill gage consists of a tubular body having a lower edge perpendicular to the axis of the body. A rotatable shaft, extending therethrough, is adapted at the upper end to be driven by the chuck of a drill motor while the lower end is adapted to facilitate the combination drill-reamer. Integral with the tubular body is an adjustable stop to limit penetration of the drill into the workpiece.

While the effectiveness of the penetration delimiting stop is functionally adequate, the angular alignment facility leaves much to be desired. The operator of the drilling apparatus must maintain absolute contact between the entire periphery of the lower edge of the tubular body and the sheet stock. Any slight curvature or surface irregularity of the stock will abort all attempts at accurate angular alignment. Further, the relatively small diameter of the alignment tube affords the operator minimal "feel" of contact. "Feel" is the only criteria upon which the operator is dependent as the drill gage offers no mechanically precise indicator of correct alignment.

Tapered shank fasteners display maximum efficiency when installed at an angle not exceeding one-half degree from normal. However, due to accuracy limitations of current drilling apparatus, industry has accepted an arbitrary standard specification of two degrees. Slide movement of the drilling apparatus in an attempt to "feel" alignment of the drill gage results in an exaggerated conical condition at the hole entrance commonly known as "bellmouth." Considering that the head of the tapered shank fastener is counter-sunk into the surface of the stock and flush therewith, for surface finish strength, and other engineering considerations, a "bellmouth" is unacceptable.

The above stated problems, compounded with other less prevalent factors, have as a result a phenomenal rejection rate of unacceptably drilled holes. In some assemblies, the rejection rate approaches eighty (80%) percent. Where a hole is not within specified tolerance, it is redrilled for a larger size fastener. Frequently, the enlarged hole is not within specification and the operation is repeated. Consequently it is not uncommon to produce an assembly having four generations of fasteners.

It would be highly advantageous, therefore, to provide an attachment for use with drilling apparatus to facilitate proper alignment of the drill with the workpiece.

SUMMARY OF THE INVENTION

Accordingly, it is a principal object and feature of the present invention, to provide an attachment for drilling apparatus which will assure angular alignment between the drill and the stock being drilled.

Another object and feature of the invention is to provide an attachment for drilling apparatus having heightened alignment stability and relatively unaffected by minor contours or surface irregularities of the workpiece.

A further object and feature of the invention is the provision of an attachment of the above type having an indicator responsive to angular alignment and capable of transmitting alignment guidance signal to the drilling apparatus operator.

Yet another object and feature of the present invention is to provide an angular indicating drilling guide that is lightweight, compact, and simple in design and operation.

Briefly, to accomplish the desired objectives of my present invention, in accordance with a preferred embodiment thereof, I first provide a generally cylindrical housing having an internal longitudinal bore adapted near the upper portion thereof to encase the lower portion of a conventional adjustable stop drill gage in axial alignment therewith. A plurality of spaced legs, capable of supporting the drilling apparatus in pre-selected angular alignment with the workpiece, depend from the housing.

A plunger, having downwardly directed spring biasing means, is slidably located within each leg. The lower edge of each plunger protrudes from the bottom of its respective leg. A micro-switch, responsive to longitudinal movement of each plunger is carried by the housing above near the upper end of each plunger. A set of first lights is located on the upper surface of the housing, each first light indicating contact position of a corresponding switch.

Optionally, the second light, on the upper surface of the housing, connected in series with the several switches, indicates a common contact position of the several switches. A compact battery, preferably of the "pencell" type, supplies electrical energy for the system.

In operation, the angularity indicating drilling attachment is first appropriately secured to the drilling apparatus by engagement over the lower portion of the adjustable stop drill gage. As the drilling operation begins, prior to contact between the drilling attachment and the sheet stock to be drilled, each plunger is urged downwardly by its respective spring, to initially set the associated switch in the normally open position. The corresponding first light is accordingly not energized.

As contact is established between a leg and the sheet stock, the plunger is forced upwardly, activating the switch to the closed position resulting in energizing of the corresponding first light. After contact is thus effected with each leg, the second light will be energized.

The appearance of the lights is an indicator to the operator that the drilling apparatus is in correct angular alignment with the sheet stock and the drilling operation may begin. If, as frequently occurs during the drilling, the operator tilts the drilling apparatus, at least one of the first lights will be de-energized. This is an immediate visual indicator to cease the operation. Concurrently, one or more of the first lights will be energized to indicate the direction of tilt.

The immediate visual indication of loss of angular alignment and direction thereof, eliminates the necessity of the "feel" alignment technique substantially eliminating "bellmouth" holes. With proper mechanical adjustment employing microswitches of short travel, in the range of two or four mils, holes can be readily machined within the much coveted tolerance of one-half degree.

BRIEF DESCRIPTION OF THE DRAWINGS

Further and more specific objects, features and advantages of the present invention will become readily apparent to those skilled in the art from the following detailed description thereof, taken in conjunction with the drawings, in which:

FIG. 1 is a lower perspective view of an angular indicating drilling attachment, chosen for purposes of illustration, embodying the present invention, when affixed to an adjustable stop drill gage;

FIG. 2 is an upper perspective view of the angularity indicating drilling attachment of FIG. 1;

FIG. 3 is an elevational view, partly in section, specifically illustrating the angular indicating means of one leg of the invention; and, FIG. 4 is a plan view, in section, taken along the line 4—4 of FIG. 3.

DETAILED DESCRIPTION OF THE PREFERRED EMBODIMENT

Turning now to the drawings, in which the same reference numerals indicate corresponding elements throughout the several views, FIG. 1 illustrates a presently preferred embodiment of the invention chosen for purposes of illustration and shows the angularity indicating drilling attachment, generally designated by the reference character 10, and the cylindrical housing 11, thereof. Visible in this view are the housing cover 12, the depending legs 17, 18, 19 and the longitudinal central bore 20. An adjustable stop drill gage 21 is affixed within the bore 20.

A typical adjustable stop drill gage, and the example herein chosen for purposes of illustration, is the Taper-Lok Long Travel Micro Stop Countersink Cage, Model No. TLA 4900, Briles Manufacturing Company, El Segundo, Calif. Not herein specifically illustrated, but to be understood by those skilled in the art, the adjustable stop drill gage 21 is adapted, at the upper end, to be driven by the chuck of a drill motor or other drilling apparatus. The drill at the lower end passes through the bore 20 into contact with the work surface.

FIG. 2 specifically illustrates the indicator light arrangement carried on the upper surface of the housing cover 12. While the activation and function of the lights will be hereinafter described in detail, it is particularly noted that a given first light may be placed immediately above each leg and corresponds thereto. First light 27 corresponds to leg 17, first light 28 is associated with leg 18, and first light 29 corresponds to leg 19. The second light 30 is randomly placed upon the upper surface of the cover 12. The selected arrangement and location of first lights 27, 28, and 29 should be such as to make efficient for the operator the visual "matching" of first lights and leg locations.

FIG. 3 details the elements within one leg and the associated first light. A plunger pin 31 having an angular flange 32 is slidable within bore 33 and counterbore 34 extending vertically within leg 17. A coil compression spring 35 coaxially encompasses the plunger pin 31 within the counterbore 34. The spring 35 rests upon the flange 32 and is restrained by the hollow set screw 36 to exert downward force upon the plunger. It is noted that the lower end of the plunger pin 31, protrudes from the bottom of the leg 17 only slightly. A maximum protrusion of four mils is adequate for effective operation.

A micro-switch 37 responsive to the movement of the plunger 33 is secured to the housing 11 above the plunger 33. The micro-switch 37 is of the short travel type, two to four mil activation, and has three terminals; a common terminal 39, a normally closed terminal 40, and a normally open terminal 41. First light 27, in the arrangement including second light 30, is electrically connected to the normally closed terminal 40. As herein depicted, with the plunger in the downward position and the lower tip thereof protruding from the base of the leg, the light is energized. Contact between the leg and the sheet stock, urging the plunger tip upwardly into the plane of the bottom of the leg activates the switch, opening the normally closed contact and discontinuing power supply to the light. The second light 30 is connected in series with each of the normally closed terminals of each respective micro-switch. After the several switches have been activated as detailed above, the light 30 is energized.

It will be apparent that the light 30 is optional and may be eliminated without major interference with adequate use of the present invention.

In the preferred arrangement (without light 30) the switches are simplified. The specific leg 17, here chosen for purposes of illustration, is typical of each leg 18 and 19. The light 27 is electrically connected to the normally open terminal 39. As herein depicted, with the plunger in the downward position and the lower tip thereof protruding from the base of the leg, the light is off. Contact between the leg and the sheet stock uring the plunger tip upward into the plane of the bottom of the leg activates the switch energizing the light. After all switches are activated, all lights will be energized, indicating that the tool is now perpendicular to the surface to be drilled. Should one or more lights go out, this indicates that the position of the tool has changed. By tilting the tool in the direction of an inactivated light, it will be energized again, bringing it back to a normal position.

FIG. 4 illustrates the accommodations for the electrical system within the cover 12. In this view, one of the microswitches has been removed to display the relative arrangement of the plunger pin 31 and set screw 36. A battery 44 contained within a bore 45 supplies electrical energy for the lights.

Various changes in the device herein chosen for purposes of illustration in the drawings will readily occur to persons skilled in the art having regard for the disclosure hereof. The upper portion of the central bore may be readily modified, or an adapter utilized, to fit the attachment for use with other types of drilling apparatus. To the extent that such modifications and variations do not depart from the spirit of the invention, they are intended to be included within the scope thereof which is not limited to the device specifically illustrated but rather only a fair interpretation of the following claims.

Having fully described the invention in such manner as to enable those skilled in the art to understand and practice the same, I claim:

1. An attachment for use at the drill end of an adjustable stop drill gage for drilling holes of predetermined depth in sheet stock, whereby said adjustable stop drill gage may be maintained at a preselected angle to said stock, said attachment comprising: housing means for attachment to the drill end of an adjustable stop drill gage, a plurality of legs depending from said housing means and adapted for substantially contacting said stock to maintain said adjustable stop drill gage at said preselected angle, and indicator means associated with said legs and said housing means responsive to contact between said legs and said stock.

2. The attachment of claim 1 wherein:
   (a) said housing means comprises a cylindrical housing having an internal longitudinal bore capable of securement in axial alignment with said adjustable stop drill gage; and
   (b) said indicator means comprises:
      (1) a plunger slidable within each of said leg and having one end thereof capable of protruding from the lower edge of said leg;
      (2) biasing means to urge said plunger downwardly;
      (3) said indicator means so constructed and arranged that said indicator means is responsive to movement of said plunger.

3. The attachment of claim 2, wherein said indicator means includes:
   (a) an electronic switch responsive to movement of said plunger;
   (b) a light activated by said switch; and
   (c) electric power supply means capable of powering said light.

4. The attachment of claim 2, wherein said indicator means includes:
   (a) an electronic switch associated with each said plunger and responsive to the movements thereof;
   (b) a plurality of first lights, each associated with one of said switches and activated thereby;
   (c) a second light connected in series with the several switches; and
   (d) electronic power supply means capable of powering said first and said second lights.

References Cited
UNITED STATES PATENTS 2,448,361   8/1948   Dudrick _____ 77—55

FRANCIS S. HUSAR, Primary Examiner

U.S. Cl. X.R.

340—267, 282